United States Patent
Saiki et al.

(10) Patent No.: US 9,670,336 B2
(45) Date of Patent: Jun. 6, 2017

(54) METHOD FOR PRODUCING RUBBER COMPOSITION, AND RUBBER COMPOSITION

(71) Applicant: BRIDGESTONE CORPORATION, Chuo-ku, Tokyo (JP)

(72) Inventors: Aya Saiki, Kunitachi (JP); Haruki Minojima, Toda (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 14/774,244

(22) PCT Filed: Mar. 24, 2014

(86) PCT No.: PCT/JP2014/001679
§ 371 (c)(1),
(2) Date: Sep. 10, 2015

(87) PCT Pub. No.: WO2014/156111
PCT Pub. Date: Oct. 2, 2014

(65) Prior Publication Data
US 2016/0017121 A1 Jan. 21, 2016

(30) Foreign Application Priority Data

Mar. 28, 2013 (JP) .................................. 2013-069716

(51) Int. Cl.
C08K 5/25 (2006.01)
C08K 3/04 (2006.01)
C08J 3/24 (2006.01)

(52) U.S. Cl.
CPC ............. *C08K 5/25* (2013.01); *C08J 3/243* (2013.01); *C08K 3/04* (2013.01); *C08J 2307/00* (2013.01)

(58) Field of Classification Search
CPC ..................................... C08K 5/25; C08K 3/04
See application file for complete search history.

(56) References Cited

U.S. PATENT DOCUMENTS

| 5,693,695 A | 12/1997 | Toratani et al. |
| 5,710,200 A | 1/1998 | Toratani et al. |
| 2002/0035195 A1 | 3/2002 | Toratani et al. |
| 2004/0106724 A1 | 6/2004 | Toratani et al. |
| 2012/0277359 A1* | 11/2012 | Thuilliez ............ B60C 1/00 524/192 |

FOREIGN PATENT DOCUMENTS

| CN | 102257055 A | 11/2011 |
| EP | 2206730 A1 | 7/2010 |
| EP | 2770022 A1 | 8/2014 |
| JP | H06-256570 A | 9/1994 |
| JP | 2002-201300 A | 7/2002 |
| JP | 2006-176594 A | 7/2006 |
| JP | 2007-023070 A | 2/2007 |
| JP | 2010-065126 A | 3/2010 |
| JP | 2010-121082 A | 6/2010 |
| JP | 2013-144761 A | 7/2013 |
| WO | 2012/084821 A1 | 6/2012 |

OTHER PUBLICATIONS

Jun. 10, 2014 International Search Report issued in International Patent Application No. PCT/JP2014/001679

* cited by examiner

*Primary Examiner* — Robert Harlan
(74) *Attorney, Agent, or Firm* — Kenja IP Law PC

(57) ABSTRACT

We provide a method for producing a rubber composition that includes a rubber component (A) including natural rubber, at least one filler (B) selected from an inorganic filler and carbon black, and a hydrazide compound (C), the method comprising compounding in an optional preliminary compounding stage and a plurality of compounding stages, and adding the hydrazide compound (C) and kneading in the preliminary compounding stage and/or a first compounding stage, the hydrazide compound (C) being represented by general formula (I): R—CONHNH$_2$, where R represents an alkyl group having from 1 to 30 carbon atoms, a cycloalkyl group having from 3 to 30 carbon atoms, or an aryl group. We also provide a rubber composition produced with this method.

5 Claims, No Drawings

METHOD FOR PRODUCING RUBBER COMPOSITION, AND RUBBER COMPOSITION

TECHNICAL FIELD

This disclosure relates to a method for producing a rubber composition and to a rubber composition produced with this method.

BACKGROUND

The viscosity of natural rubber increases (gelation occurs) during production, storage, and transport. The reason is thought to be that carbon-heteroatom bonds in the isoprene chain (aldehyde groups and the like) cross-link and undergo gelation due to reacting with proteins, amino acids, and the like in the natural rubber. This mechanism, however, has not been definitively explained.

This gelation is problematic, as it results in a degradation in the workability of the natural rubber as well as in physical properties, such as carbon black dispersibility and the like, upon combination with additives to yield a rubber composition. In order to resolve these problems, before the compounding step, a mastication step is performed to unravel molecular aggregates of rubber with a shear force and cut molecular chains, thereby peptizing the gel produced in the natural rubber. The mastication step is normally performed in one or more stages, using a different masticator from the kneader, or by removing the natural rubber after the mastication step and then reinserting the natural rubber into the kneader for the compounding step. In the mastication step, kneading is performed for longer than the preliminary compounding stage of the compounding step, the purpose of which is to increase the dispersibility of the additives. An alternative is to use stable viscosity natural rubber, yielded by adding a viscosity stabilizer to natural rubber at the time of production to suppress an increase in viscosity. For example, JP H6-256570 A (PTL 1) discloses the production of stable viscosity natural rubber yielded by adding a particular hydrazide compound to natural rubber.

CITATION LIST

Patent Literature

PTL 1: JP H6-256570 A

SUMMARY

Technical Problem

Performing a mastication step, however, adds one or more extra stages as compared to when only a compounding step is performed, and the natural rubber is kneaded for longer than the preliminary compounding stage of the compounding step, as described above. Therefore, there are problems that production efficiency is reduced, and both $CO_2$ emissions and energy consumption increase. On the other hand, when using stable viscosity natural rubber, it is difficult to ensure a sufficient supply of the stable viscosity natural rubber, and production costs are high. Hence, there is a need for a method for producing a rubber composition that suppresses energy consumption while improving the workability of natural rubber without performance of a mastication step or use of stable viscosity natural rubber and that achieves good physical properties, such as carbon black dispersibility, upon combination of the natural rubber with additives to yield a rubber composition.

Solution to Problem

We discovered that adding a particular hydrazide compound, in a particular stage within the compounding step, to a rubber component including natural rubber and kneading can suppresse energy consumption while improving the workability of natural rubber without performance of a mastication step or use of stable viscosity natural rubber and yield a rubber composition that has good carbon black dispersibility.

Namely, we provide a method for producing a rubber composition that includes a rubber component (A) including natural rubber, at least one filler (B) selected from an inorganic filler and carbon black, and a hydrazide compound (C), the method comprising: compounding in an optional preliminary compounding stage and a plurality of compounding stages, and adding the hydrazide compound (C) and kneading in the preliminary compounding stage and/or a first compounding stage, the hydrazide compound (C) being represented by general formula (I):

$$R\text{—}CONHNH_2 \qquad (I)$$

where R represents an alkyl group having from 1 to 30 carbon atoms, a cycloalkyl group having from 3 to 30 carbon atoms, or an aryl group.

In our method for producing a rubber composition, the R group of the hydrazide compound (C) represented by general formula (I) is preferably selected from the group consisting of alkyl groups having from 1 to 10 carbon atoms.

Our method for producing a rubber composition preferably further comprises adding a portion or all of an anti-aging agent and kneading in a final compounding stage.

In our method for producing a rubber composition, the hydrazide compound (C) is preferably added in the preliminary compounding stage.

In our method for producing a rubber composition, the hydrazide compound (C) is preferably propionic acid hydrazide.

In our method for producing a rubber composition, the filler (B) is preferably carbon black having a nitrogen adsorption specific surface area ($N_2SA$) of 40 $m^2/g$ to 250 $m^2/g$ or a DBP absorption of 20 mL/100 g to 200 mL/100 g.

We also provide a rubber composition produced with the above method.

Advantageous Effect

We thus provide a method for producing a rubber composition that suppresses energy consumption while improving the workability of natural rubber without performance of a mastication step or use of stable viscosity natural rubber and that has good carbon black dispersibility. According to this production method, we also provide a rubber composition having good unvulcanized viscosity and carbon black dispersibility.

DETAILED DESCRIPTION

In our production method and rubber composition, the rubber component (A) includes natural rubber. The natural rubber used in our production method is a solid natural rubber (crude rubber) yielded by solidifying natural rubber latex. Examples include technically specified rubber (TSR), smoked sheet rubber (RSS), crepe, low-grade rubber, heveacrumb, and oil extended natural rubber. A single type or a combination of two or more types of these natural rubbers may be used. A portion or all of the natural rubber used in the rubber component (A) may be natural rubber in which any of a main chain, side chain, or terminal, or two or more of these, is modified by a functional group and/or denatured by a denaturant. The natural rubber in the rubber component (A) may be included in any proportion, and the rubber component (A) may be composed exclusively of natural rubber.

The rubber component (A) may include synthetic rubber in addition to natural rubber. Any type of synthetic rubber may be included in the rubber composition (A). Examples include styrene-butadiene rubber, butadiene rubber, isoprene rubber, butyl rubber, chloroprene rubber, nitrile rubber, ethylene-propylene rubber, chlorosulfonated polyethylene, acrylic rubber, fluorine-containing rubber, hydrin rubber, silicone rubber, sulfide rubber, and urethane rubber. A portion or all of the synthetic rubber may be synthetic rubber in which any of a main chain, side chain, or terminal, or two or more of these, is modified by a functional group and/or denatured by a denaturant.

At least one filler (B) selected from carbon black and an inorganic filler is used in our method and rubber composition. Any type of carbon black may be used as the filler (B). Examples include SAF, ISAF, HAF, FF, FEF, GPF, SRF, CF, FT, and MT grades carbon black. Among these, carbon black having a nitrogen adsorption specific surface area ($N_2SA$) of 40 $m^2/g$ to 250 $m^2/g$ or a DBP absorption of 20 mL/100 g to 200 mL/100 g is preferable.

Examples of the inorganic filler that may be used as the filler (B) include silica and inorganic compounds represented by the following general formula:

$$mM.xSiO_y.zH_2O \quad (II)$$

(where M is a metal selected from the group consisting of aluminum, magnesium, titanium, calcium, and zirconium, oxides or hydroxides of the above metals, hydrates thereof, and carbonates of the above metals; and m, x, y, and z are an integer of 1 to 5, an integer of 0 to 10, an integer of 2 to 5, and an integer of 0 to 10 respectively). Wet silica, dry silica, colloidal silica, or the like may be used as the silica. Examples of the inorganic compound of general formula (II) include alumina ($Al_2O_3$) such as γ-alumina, α-alumina, and the like; alumina monohydrate ($Al_2O_3.H_2O$) such as boehmite, diaspore, and the like; aluminum hydroxide [$Al(OH)_3$] such as gypsite, bayerite, and the like; aluminum carbonate [$Al_2(CO_3)_3$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide [$Ca(OH)_2$], aluminum magnesium oxide ($MgO.Al_2O_3$), clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminum silicate ($Al_2SiO_5$, $Al_4.3SiO_4.5H_2O$, and the like), magnesium silicate ($Mg_2SiO_4$, $MgSiO_3$, and the like), calcium silicate ($Ca_2SiO_4$, and the like), aluminum calcium silicate ($Al_2O_3.CaO.2SiO_2$, and the like), magnesium calcium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO_3)_2$]; and crystalline aluminosilicate salts containing a charge-correcting hydrogen, alkali metal, or alkaline earth metal, such as various types of zeolite. A single type or a combination of two or more types of these fillers may be used.

Any amount of the filler (B) may be added. While the amount depends on the type and composition of filler (B) and rubber component (A) that are used, the amount of filler (B) is preferably 5 to 100 parts by weight per 100 parts by weight of the rubber composition (A).

The hydrazide compound (C) represented by general formula (I) is used:

$$R-CONHNH_2 \quad (I)$$

(where R represents an alkyl group having from 1 to 30 carbon atoms, a cycloalkyl group having from 3 to 30 carbon atoms, or an aryl group). Examples of the hydrazide compound that is an alkyl group having from 1 to carbon atoms include acetohydrazide, propionic acid hydrazide, isopropionic acid hydrazide, butanoic acid hydrazide, isobutanoic acid hydrazide, pentanoic acid hydrazide, isopentanoic acid hydrazide, hexanoic acid hydrazide, isohexanoic acid hydrazide, heptanoic acid hydrazide, isoheptanoic acid hydrazide, octanoic acid hydrazide, 2-ethylhexanoic acid hydrazide, nonanoic acid hydrazide, decanoic acid hydrazide, undecanoic acid hydrazide, lauric acid hydrazide, palmitic acid hydrazide, stearic acid hydrazide, and the like. Examples of the hydrazide compound that is a cycloalkyl group having from 3 to 30 carbon atoms include cyclopropylhydrazide, cyclohexylhydrazide, cycloheptylhydrazide, and the like. The hydrazide compound that is an aryl group may include a substituent group. Examples include phenylhydrazide ($C_6H_5-CONHNH_2$), o-,m-,p-tolylhydrazide, p-methoxyphenylhydrazide, 3,5-xylylhydrazide, 1-naphthylhydrazide, and the like. Among these, a hydrazide compound in which the R group has a small number of carbon atoms, specifically a hydrazide compound of general formula (I) selected from the group consisting of alkyl groups having from 1 to 10 carbon atoms is preferable. Propionic acid hydrazide is more preferable. A single type or a combination of two or more types of the hydrazide compound of general formula (I) may be used. The hydrazide compounds represented by the above general formula are widely-known substances, and the method of manufacturing these hydrazide compounds is also known.

The amount of the hydrazide compound (C) represented by general formula (I) added into the rubber composition is preferably 0.001 parts by mass or more per 100 parts by mass of natural rubber. As long as the added amount of the hydrazide compound (C) is 0.001 parts by mass or more, the effect of preventing gelation of the natural rubber can be sufficiently achieved. The added amount of the hydrazide compound slightly varies depending on the type of natural rubber that is used and the type of the hydrazide compound that is used. A preferable range is from 0.1 parts by mass to 3.0 parts by mass. For example, the added amount of hydrazide compounds in which R has from 1 to 10 carbon atoms is preferably 0.1 parts by mass to 1.0 parts by mass. The reason is that if the added amount of the hydrazide compound (C) is within this range, a good balance is achieved in the rubber composition between physical properties (for example, macro-dispersibility of carbon black, hysteresis loss, and the like) and workability.

The compounding step in our method for production is performed in an optional preliminary compounding stage and a plurality of compounding stages. The compounding step is the step in which additives, such as filler, are mixed and dispersed into the rubber component. The preliminary compounding stage is performed to loosen the rubber component before compounding with additives, such as filler, in the kneader that performs the compounding step. In our method, this preliminary compounding stage is an optional stage that may be performed or omitted as necessary. While the compounding refers to adding additives, such as filler, to the rubber composition and kneading after the optional preliminary compounding stage. In our method, the first compounding stage refers to the initial stage of adding, mixing, and dispersing the filler (B) into the rubber component (A). The compounding is performed in a plurality of stages, i.e. the compounding includes at least one compounding stage other than the first compounding stage. This compounding stage other than the first compounding stage may, for example, be a stage to add, mix, and disperse other additives such as a vulcanizing agent (for example, sulfur). The compounding step may include any stages to add, mix, and disperse additives other than the filler (B) and the hydrazide compound (C). A portion or all of such other additives may be added, mixed, and dispersed in the preliminary compounding stage and/or the first compounding stage, or may be added, mixed, and dispersed in the second compounding stage or thereafter.

In our method for producing a rubber composition, the hydrazide compound (C) represented by general formula (I) is added in the preliminary compounding stage and/or the first compounding stage. In other words, the hydrazide compound (C) may be added in both the preliminary compounding stage and the first compounding stage, or added in only one of the preliminary compounding stage and the first compounding stage. The reason is that when adding the hydrazide compound (C) in the preliminary compounding stage and/or the first compounding stage, the hydrazine compound (C) sufficiently reacts with the carbon-heteroatom bonds (aldehyde groups and the like) in the isoprene chain of the natural rubber, thereby effectively blocking the carbon-heteroatom bonds in the isoprene chain from undergoing a cross-linking reaction with proteins and amino acids in the natural rubber. Gelation of the natural rubber can thus be prevented.

The hydrazide compound (C) represented by general formula (I) is preferably added in the preliminary compounding stage. The reason is that when adding the hydrazide compound (C) and kneading with the rubber component (A) in the preliminary compounding stage, the dispersibility of the filler (B) added in the subsequent first compounding stage is further increased.

The preliminary compounding stage is performed at a temperature of 70° C. to 120° C. for 15 seconds to 60 seconds. The first compounding stage is performed at a starting temperature of 70° C. to 120° C. for 30 seconds to 180 seconds. For the compounding stages from the second compounding stage onward, the starting temperature and time may be appropriately set in accordance with the type of additive being added. For example, a compounding stage to add, mix, and disperse a vulcanizing agent may be performed at a lower temperature than the first compounding stage, such as a starting temperature of 50° C. to 90° C., for 30 seconds to 180 seconds.

The compounding step may be performed in a batch process or continuous process, using a typical rubber kneader such as a Banbury mixer, a Brabender plastograph, a roll, a kneader, or the like.

In our method for producing a rubber composition, in the compounding step, any typical additive used in the rubber industry other than the filler (B) and the hydrazide compound (C), such as a vulcanizing agent, vulcanizing aid, vulcanizing promoter, softener, anti-aging agent, anti-scorching agent, processing aid, filler modifier, tackifier, foaming agent, colorant, or the like may be added in as needed in accordance with purpose. Among these additives, additives other than a vulcanizing agent may be added in any order and in any compounding stage, as described above. Commercially available additives may be used.

Among the above additives, an anti-aging agent is preferably added in the final compounding stage. The reason is that as compared to when the anti-aging agent is added in the preliminary compounding stage or in an earlier compounding stage than the final compounding stage (for example, the first compounding stage), a worsening of hysteresis loss in the resulting rubber composition can be prevented.

By performing a molding step, assembly step, heating and vulcanizing step, and the like for different purposes on the rubber composition on which the above compounding step has been performed, a desired rubber product can be produced. For example, from the rubber composition produced by our method for production, a wide variety of rubber products may be produced, such as a tire, belt, hose, footwear, anti-vibration rubber, rubber parts, and the like.

EXAMPLES

More specific details are now provided through Examples and Comparative Examples, yet such examples are not meant to limit the scope of this disclosure.

[Preparation and Evaluation of Rubber Composition]

Using a Labo Plastomill (produced by Toyo Seiki Seisaku-Sho, Ltd.), the rubber compositions of the Examples and Comparative Examples were prepared using the formulations listed in Tables 1 and 2 below. In Comparative Examples 1 to 3, the compounding step was performed after performing a mastication step at a starting temperature of 90° C. for 2 minutes. In Examples 1 to 26 and Comparative Examples 4 to 21, only the compounding step was performed, without performing a mastication step. In the compounding step, the optional preliminary compounding stage was performed at a starting temperature of 90° C. for 30 seconds, the first compounding stage was performed at a starting temperature of 90° C. for 2 minutes, and the final compounding stage (second compounding stage) was performed at a starting temperature of 70° C. for 1 minute. For these Examples and Comparative Examples, the kneading energy required up until completion of the compounding step, the unvulcanized viscosity of the resulting rubber composition, the macro-dispersibility of carbon black, and hysteresis loss were evaluated with the following methods.

(1) Kneading Energy

Using a Labo Plastomill (produced by Toyo Seiki Seisaku-Sho, Ltd.), the torque (power) required for kneading up until completion of the compounding step was measured, and the magnitude of the torque was compared. For the evaluation value, each measured value of the Examples and the Comparative Examples was expressed as an index, with the measured value of Comparative Example 1 being 100. A smaller evaluation value (index value) indicates less kneading energy required up until completion of the compounding step, which allows for a reduction in overall $CO_2$ emissions and energy consumption in the method for production.

(2) Macro-Dispersibility of Carbon Black

The degree of dispersibility of carbon black evaluated as a value of 1 to 10 in conformity with ISO 11345:2006 was listed as macro-dispersibility. For the evaluation value, the value for the Examples and the Comparative Examples was expressed as an index, with the value of Comparative Example 1 being 100. A larger evaluation value (index value) indicates higher macro-dispersibility of carbon black in the rubber composition, which yields excellent fracture resistance when the rubber composition is made into a rubber product.

(3) Unvulcanized Viscosity

In conformity with JIS-K6300-1:2001, an L-type rotor was used with a Mooney Viscometer (RPA, produced by Monsanto Company) at 130° C. to measure the Mooney viscosity [$ML_{1+4}$ (130° C.)] of an unvulcanized rubber composition. For the evaluation value of the unvulcanized viscosity, each measured value of the Examples and the Comparative Examples was expressed as an index, with the measured value of Comparative Example 1 being 100. A smaller evaluation value (index value) indicates better flow properties of the unvulcanized rubber composition and better workability.

(4) Hysteresis Loss (tan δ)

Vulcanized rubber was obtained by vulcanizing the rubber composition at a mold temperature of 145° C. for 33 minutes. A test piece was produced from the vulcanized rubber. Using a viscoelasticity meter (spectrometer produced by Ueshima Seisakusho Co., Ltd.), the loss tangent (tan δ) was measured under the conditions of 100° C., a frequency of 52 Hz, initial strain of 10%, and dynamic strain of 1%. For the evaluation value, each tan δ of the Examples and the Comparative Examples was expressed as an index, with the value of tan δ of Comparative Example 1 being 100. A smaller evaluation value indicates a smaller value for tan δ (hysteresis loss) of the vulcanized rubber and better low loss properties, i.e. low-heat-generating properties.

TABLE 1

| | Parts by mass | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Preliminary compounding stage | Natural rubber *1 | 100 | 100 | 100 | 100 | 100 | 100 | 100 | 100 | — | — | — | — |
| | Aromatic oil *2 | — | 5 | 5 | 5 | 5 | 5 | 5 | 5 | — | — | — | — |
| | Zinc oxide | — | 1 | 1 | 1 | 1 | 1 | 1 | 1 | — | — | — | — |
| | Stearic acid | — | 2 | 2 | 2 | 2 | 2 | 2 | 2 | — | — | — | — |
| | Anti-aging agent 6C *7 | — | — | — | — | — | — | 0.5 | 1 | — | — | — | — |
| | Propionic acid hydrazide | 0.15 | 0.05 | 0.08 | 0.13 | 0.25 | 0.5 | 0.13 | 0.13 | — | — | — | — |
| First compounding stage | Natural rubber *1 | — | — | — | — | — | — | — | — | 100 | 100 | 100 | 100 |
| | Masticated natural rubber | — | — | — | — | — | — | — | — | — | — | — | — |
| | BR *3 | — | — | — | — | — | — | — | — | — | — | — | — |
| | Carbon black A *4 | 50 | 50 | 50 | 50 | 50 | 50 | 50 | 50 | 50 | 50 | 50 | 50 |
| | Carbon black B *5 | — | — | — | — | — | — | — | — | — | — | — | — |
| | Carbon black C *6 | — | — | — | — | — | — | — | — | — | — | — | — |
| | Aromatic oil *2 | 5 | — | — | — | — | — | — | — | 5 | 5 | 5 | 5 |
| | Stearic acid | 2 | — | — | — | — | — | — | — | 2 | 2 | 2 | 2 |
| | Zinc oxide | 1 | — | — | — | — | — | — | — | 1 | 1 | 1 | 1 |
| | Anti-aging agent 6C *7 | — | — | — | — | — | — | — | — | — | — | — | — |
| | Propionic acid hydrazide | — | — | — | — | — | — | — | — | 0.05 | 0.08 | 0.13 | 0.25 |
| | Palmitic acid hydrazide | — | — | — | — | — | — | — | — | — | — | — | — |
| | Lauric acid hydrazide | — | — | — | — | — | — | — | — | — | — | — | — |
| | Stearic acid hydrazide | — | — | — | — | — | — | — | — | — | — | — | — |
| Final compounding stage | Anti-aging agent 6C *7 | 1 | 1 | 1 | 1 | 1 | 1 | 0.5 | — | 1 | 1 | 1 | 1 |
| | Zinc oxide | 2 | 2 | 2 | 2 | 2 | 2 | 2 | 2 | 2 | 2 | 2 | 2 |
| | Vulcanizing promoter CZ *8 | 0.8 | 0.8 | 0.8 | 0.8 | 0.8 | 0.8 | 0.8 | 0.8 | 0.8 | 0.8 | 0.8 | 0.8 |
| | Sulfur | 1 | 1 | 1 | 1 | 1 | 1 | 1 | 1 | 1 | 1 | 1 | 1 |
| Evaluation | Kneading energy | 64 | 67 | 67 | 67 | 67 | 67 | 67 | 67 | 68 | 68 | 69 | 69 |
| | Macro-dispersibility of carbon black | 105 | 100 | 106 | 106 | 106 | 106 | 106 | 106 | 100 | 100 | 100 | 100 |
| | Unvulcanized viscosity | 99 | 99 | 95 | 93 | 92 | 90 | 93 | 93 | 99 | 99 | 93 | 92 |
| | Hysteresis loss (tan δ) | 100 | 100 | 100 | 100 | 102 | 103 | 102 | 105 | 100 | 100 | 100 | 102 |

| | Parts by mass | Examples | | Comparative Examples | | | | | | | | | | | |
|---|---|---|---|---|---|---|---|---|---|---|---|---|---|---|---|
| | | 13 | 14 | 1 | 2 | 3 | 4 | 5 | 6 | 7 | 8 | 9 | 10 | 11 | 12 |
| Preliminary compounding stage | Natural rubber *1 | — | — | — | — | — | 100 | 100 | 100 | — | — | — | 100 | 100 | 100 |
| | Aromatic oil *2 | — | — | — | — | — | — | — | — | — | — | — | 5 | 5 | 5 |
| | Zinc oxide | — | — | — | — | — | — | — | — | — | — | — | 1 | 1 | 1 |
| | Stearic acid | — | — | — | — | — | — | — | — | — | — | — | 2 | 2 | 2 |
| | Anti-aging agent 6C *7 | — | — | — | — | — | — | — | — | — | — | — | — | 0.5 | 1 |
| | Propionic acid hydrazide | — | — | — | — | — | — | — | — | — | — | — | — | — | — |
| First compounding stage | Natural rubber *1 | 100 | 100 | — | — | — | — | — | — | 100 | 100 | 100 | — | — | — |
| | Masticated natural rubber | — | — | 100 | 100 | 100 | — | — | — | — | — | — | — | — | — |
| | BR *3 | — | — | — | — | — | — | — | — | — | — | — | — | — | — |
| | Carbon black A *4 | 50 | 50 | 50 | 50 | 50 | 50 | 50 | 50 | 50 | 50 | 50 | 50 | 50 | 50 |
| | Carbon black B *5 | — | — | — | — | — | — | — | — | — | — | — | — | — | — |
| | Carbon black C *6 | — | — | — | — | — | — | — | — | — | — | — | — | — | — |
| | Aromatic oil *2 | 5 | 5 | 5 | 5 | 5 | 5 | 5 | 5 | 5 | 5 | 5 | — | — | — |
| | Stearic acid | 2 | 2 | 2 | 2 | 2 | 2 | 2 | 2 | 2 | 2 | 2 | — | — | — |
| | Zinc oxide | 1 | 1 | 1 | 1 | 1 | 1 | 1 | 1 | 1 | 1 | 1 | — | — | — |
| | Anti-aging agent 6C *7 | — | 1 | — | 0.5 | 1 | — | 0.5 | 1 | — | 0.5 | 1 | — | — | — |
| | Propionic acid hydrazide | 0.5 | 0.13 | — | — | — | — | — | — | — | — | — | — | — | — |
| | Palmitic acid hydrazide | — | — | — | — | — | — | — | — | — | — | — | — | — | — |
| | Lauric acid hydrazide | — | — | — | — | — | — | — | — | — | — | — | — | — | — |
| | Stearic acid hydrazide | — | — | — | — | — | — | — | — | — | — | — | — | — | — |

TABLE 1-continued

|  |  |  |  |  |  |  |  |  |  |  |  |  |  |  |  |
|---|---|---|---|---|---|---|---|---|---|---|---|---|---|---|---|
| Final compounding stage | Anti-aging agent 6C *7 | 1 | — | 1 | 0.5 | — | 1 | 0.5 | — | 1 | 0.5 | — | 1 | 0.5 | — |
|  | Zinc oxide | 2 | 2 | 2 | 2 | 2 | 2 | 2 | 2 | 2 | 2 | 2 | 2 | 2 | 2 |
|  | Vulcanizing promoter CZ *8 | 0.8 | 0.8 | 0.8 | 0.8 | 0.8 | 0.8 | 0.8 | 0.8 | 0.8 | 0.8 | 0.8 | 0.8 | 0.8 | 0.8 |
|  | Sulfur | 1 | 1 | 1 | 1 | 1 | 1 | 1 | 1 | 1 | 1 | 1 | 1 | 1 | 1 |
| Evaluation | Kneading energy | 69 | 69 | 100 | 100 | 100 | 70 | 70 | 70 | 67 | 67 | 67 | 67 | 67 | 67 |
|  | Macro-dispersibility of carbon black | 100 | 100 | 100 | 100 | 100 | 60 | 60 | 60 | 55 | 55 | 55 | 80 | 80 | 80 |
|  | Unvulcanized viscosity | 90 | 93 | 100 | 100 | 100 | 104 | 104 | 104 | 104 | 104 | 104 | 103 | 103 | 103 |
|  | Hysteresis loss (tan δ) | 103 | 105 | 100 | 100 | 100 | 100 | 100 | 100 | 100 | 100 | 100 | 100 | 100 | 100 |

*1 TSR 20 (type of natural rubber)
*2 "A/O MIX" produced by Sankyo Yuka Kogyo K.K.
*3 "UBEPOL-BR150B" produced by Ube Industries, Ltd.
*4 "SEAST 3" produced by Tokai Carbon Co., Ltd., $N_2SA$: 79 $m^2/g$, DBP: 101 ml/100 g
*5 "SEAST 7HM" produced by Tokai Carbon Co., Ltd., $N_2SA$: 126 $m^2/g$, DBP: 125 ml/100 g
*6 "SEAST 9" produced by Tokai Carbon Co., Ltd., $N_2SA$: 142 $m^2/g$, DBP: 139 ml/100 g
*7 "NOCRAC 6C" produced by Ouchi Shinko Chemical Industrial Co., Ltd., N-1,3-dimethylbutyl-N'-phenyl-p-phenylenediamine
*8 "NOCCELER CZ" produced by Ouchi Shinko Chemical Industrial Co., Ltd., N-cyclohexyl-2-benzothiazole sulfenamide

TABLE 2

| Parts by mass | | Examples | | | | | | | | | |
|---|---|---|---|---|---|---|---|---|---|---|---|
| | | 15 | 16 | 17 | 18 | 19 | 20 | 21 | 22 | 23 | 24 |
| Preliminary compounding stage | Natural rubber *1 | — | — | — | 70 | 70 | 70 | — | — | — | — |
| | BR *3 | — | — | — | 30 | 30 | 30 | — | — | — | — |
| | Aromatic oil *2 | — | — | — | 5 | 5 | 5 | — | — | — | — |
| | Zinc oxide | — | — | — | — | — | — | — | — | — | — |
| | Stearic acid | — | — | — | 2 | 2 | 2 | — | — | — | — |
| | Anti-aging agent 6C *7 | — | — | — | — | 0.5 | 1.0 | — | — | — | — |
| | Propionic acid hydrazide | — | — | — | 0.13 | 0.13 | 0.13 | — | — | — | — |
| First compounding stage | Natural rubber *1 | 100 | 100 | 100 | — | — | — | 70 | 70 | 100 | 100 |
| | Masticated natural rubber | — | — | — | — | — | — | — | — | — | — |
| | BR *3 | — | — | — | — | — | — | 30 | 30 | — | — |
| | Carbon black A *4 | 50 | 50 | 50 | 50 | 50 | 50 | 50 | 50 | — | — |
| | Carbon black B *5 | — | — | — | — | — | — | — | — | 50 | — |
| | Carbon black C *6 | — | — | — | — | — | — | — | — | — | 50 |
| | Aromatic oil *2 | 5 | 5 | 5 | — | — | — | 5 | 5 | 5 | 5 |
| | Stearic acid | 2 | 2 | 2 | — | — | — | 2 | 2 | 2 | 2 |
| | Zinc oxide | 1 | 1 | 1 | — | — | — | — | — | — | — |
| | Anti-aging agent 6C *7 | — | — | — | — | — | — | — | 1 | — | — |
| | Propionic acid hydrazide | — | — | — | — | — | — | 0.13 | 0.13 | 0.13 | 0.13 |
| | Palmitic acid hydrazide | 0.13 | — | — | — | — | — | — | — | — | — |
| | Lauric acid hydrazide | — | 0.13 | — | — | — | — | — | — | — | — |
| | Stearic acid hydrazide | — | — | 0.13 | — | — | — | — | — | — | — |
| Final compounding stage | Anti-aging agent 6C *7 | 1 | 1 | 1 | 1 | 0.5 | — | 1 | — | 1 | 1 |
| | Zinc oxide | 2 | 2 | 2 | 3 | 3 | 3 | 3 | 3 | 3 | 3 |
| | Vulcanizing promoter CZ *8 | 0.8 | 0.8 | 0.8 | 0.8 | 0.8 | 0.8 | 0.8 | 0.8 | 0.8 | 0.8 |
| | Sulfur | 1 | 1 | 1 | 1 | 1 | 1 | 1 | 1 | 1 | 1 |
| Evaluation | Kneading energy | 67 | 67 | 67 | 67 | 67 | 67 | 67 | 67 | 67 | 67 |
| | Macro-dispersibility of carbon black | 100 | 100 | 100 | 103 | 103 | 103 | 100 | 100 | 100 | 100 |
| | Unvulcanized viscosity | 97 | 98 | 98 | 94 | 94 | 94 | 94 | 94 | 94 | 94 |
| | Hysteresis loss (tan δ) | 100 | 100 | 100 | 100 | 102 | 105 | 100 | 105 | 100 | 100 |

| Parts by mass | | Examples | | Comparative Examples | | | | | | | |
|---|---|---|---|---|---|---|---|---|---|---|---|
| | | 25 | 26 | 13 | 14 | 15 | 16 | 17 | 18 | 19 | 20 | 21 |
| Preliminary compounding stage | Natural rubber *1 | — | — | 70 | 70 | 70 | — | — | — | — | — | — |
| | BR *3 | — | — | 30 | 30 | 30 | — | — | — | — | — | — |
| | Aromatic oil *2 | — | — | 5 | 5 | 5 | — | — | — | — | — | — |
| | Zinc oxide | — | — | — | — | — | — | — | — | — | — | — |
| | Stearic acid | — | — | 2 | 2 | 2 | — | — | — | — | — | — |
| | Anti-aging agent 6C *7 | — | — | — | 0.5 | 1.0 | — | — | — | — | — | — |
| | Propionic acid hydrazide | — | — | — | — | — | — | — | — | — | — | — |
| First compounding stage | Natural rubber *1 | 100 | 100 | — | — | — | 100 | 100 | 70 | 100 | 100 | 70 |
| | Masticated natural rubber | — | — | — | — | — | — | — | — | — | — | — |
| | BR *3 | — | — | — | — | — | — | — | 30 | — | — | 30 |
| | Carbon black A *4 | — | — | 50 | 50 | 50 | — | — | 50 | — | — | 50 |
| | Carbon black B *5 | 50 | — | — | — | — | 50 | — | — | 50 | — | — |
| | Carbon black C *6 | — | 50 | — | — | — | — | 50 | — | — | 50 | — |
| | Aromatic oil *2 | 5 | 5 | — | — | — | 5 | 5 | 5 | 5 | 5 | 5 |
| | Stearic acid | 2 | 2 | — | — | — | 2 | 2 | 2 | 2 | 2 | 2 |
| | Zinc oxide | — | — | — | — | — | — | — | — | — | — | — |
| | Anti-aging agent 6C *7 | 1 | 1 | — | — | — | — | — | — | 1 | 1 | 1 |
| | Propionic acid hydrazide | 0.13 | 0.13 | — | — | — | — | — | — | — | — | — |

TABLE 2-continued

|  |  | | | | | | | | | | | |
|---|---|---|---|---|---|---|---|---|---|---|---|---|
| | Palmitic acid hydrazide | — | — | — | — | — | — | — | — | — | — | — |
| | Lauric acid hydrazide | — | — | — | — | — | — | — | — | — | — | — |
| | Stearic acid hydrazide | — | — | — | — | — | — | — | — | — | — | — |
| Final com- pounding stage | Anti-aging agent 6C *7 | — | — | 1 | 0.5 | — | 1 | 1 | 1 | — | — | — |
| | Zinc oxide | 3 | 3 | 3 | 3 | 3 | 3 | 3 | 3 | 3 | 3 | 3 |
| | Vulcanizing promoter CZ *8 | 0.8 | 0.8 | 0.8 | 0.8 | 0.8 | 0.8 | 0.8 | 0.8 | 0.8 | 0.8 | 0.8 |
| | Sulfur | 1 | 1 | 1 | 1 | 1 | 1 | 1 | 1 | 1 | 1 | 1 |
| Evaluation | Kneading energy | 67 | 67 | 67 | 67 | 67 | 67 | 67 | 67 | 67 | 67 | 67 |
| | Macro-dispersibility of carbon black | 100 | 100 | 80 | 80 | 80 | 50 | 45 | 50 | 50 | 45 | 50 |
| | Unvulcanized viscosity | 94 | 94 | 103 | 103 | 103 | 105 | 105 | 105 | 105 | 105 | 105 |
| | Hysteresis loss (tan δ) | 105 | 105 | 100 | 100 | 100 | 100 | 100 | 100 | 100 | 100 | 100 |

*1 to *8 are the same as in Table 1.

Tables 1 and 2 show that as compared to Comparative Examples 1 to 3 in which a mastication step was performed, in Examples 1 to 26, in which a compounding step was performed by adding the above hydrazide compound (C) in the preliminary compounding stage and/or the first compounding stage, without performing a mastication step, not only was the kneading energy required up until completion of the compounding step decreased by 30% or more, but also a rubber composition with equivalent or better unvulcanized viscosity and carbon black dispersibility was obtained. By contrast, as compared to Examples 1 to 26, the rubber composition of Comparative Examples 4 to 21, in which a mastication step was not performed and the above hydrazide compound (C) was not added, had equivalent kneading energy required up until completion of the compounding step, yet the unvulcanized viscosity deteriorated, and the carbon black dispersibility deteriorated remarkably.

INDUSTRIAL APPLICABILITY

According to our method for production, energy consumption can be suppressed while improving the workability of natural rubber without performance of a mastication step or use of stable viscosity natural rubber, and a rubber composition having good carbon black dispersibility can be produced. According to our method for production, as compared to a conventional method for production that includes a mastication step, $CO_2$ emissions and energy consumption can be greatly reduced. Since no stable viscosity natural rubber is used, there is no need to worry over a supply shortage of stable viscosity natural rubber, and production costs can also be suppressed. Furthermore, it is possible to provide a rubber composition having good unvulcanized viscosity and carbon black dispersibility as well as a rubber product that is produced from the rubber composition and has excellent fracture resistance.

The invention claimed is:

1. A method for producing a rubber composition that includes a rubber component (A) including natural rubber, at least one filler (B) selected from an inorganic filler and carbon black, and a monohydrazide compound (C), the method comprising:
  compounding in an optional preliminary compounding stage and a plurality of compounding stages, the preliminary compounding stage and the plurality of compounding stages being carried out in a single kneader,
  adding the monohydrazide compound (C) and kneading in the preliminary compounding stage and/or a first compounding stage,
  the monohydrazide compound (C) being represented by general formula (I):

R—CONHNH$_2$  (I)

where R represents an alkyl group having from 1 to 30 carbon atoms, a cycloalkyl group having from 3 to 30 carbon atoms, or an aryl group, and
  adding a portion or all of an anti-aging agent and kneading in a final compounding stage.

2. The method of claim 1, wherein the R group of the monohydrazide compound (C) represented by general formula (I) is selected from the group consisting of alkyl groups having from 1 to 10 carbon atoms.

3. The method of claim 1, wherein the monohydrazide compound (C) is added in the preliminary compounding stage.

4. The method of claim 1, wherein the monohydrazide compound (C) is propionic acid hydrazide.

5. The method of claim 1, wherein the filler (B) is carbon black having a nitrogen adsorption specific surface area of 40 m$^2$/g to 250 m$^2$/g or a DBP absorption of 20 mL/100 g to 200 mL/100 g.

* * * * *